United States Patent [19]
Bien et al.

[11] Patent Number: 5,497,544
[45] Date of Patent: Mar. 12, 1996

[54] STATOR FRAME FABRICATION

[75] Inventors: Paul R. Bien, Erie, Pa.; Michael P. Hagle, Mason, Ohio

[73] Assignee: General Electric Company, Erie, Pa.

[21] Appl. No.: 247,738

[22] Filed: May 23, 1994

[51] Int. Cl.⁶ .................................................. H02K 15/14
[52] U.S. Cl. ...................... 29/596; 228/165; 228/169; 228/171; 310/42; 310/89; 310/258
[58] Field of Search ............ 29/596, 598; 310/258–260, 310/42, 89; 228/165, 169, 171

[56] References Cited

U.S. PATENT DOCUMENTS 1,655,931  1/1928  Langstroth ........................... 228/169 X
3,849,871  11/1974 Kaunitz ................................... 228/169
4,993,620  2/1991  Kornely, Jr. et al. ................... 228/169

*Primary Examiner*—Carl E. Hall
*Attorney, Agent, or Firm*—Ann M. Agosti; Marvin Snyder

[57]  ABSTRACT

A stator frame comprises a connection end (CE) casting having at least one CE integral partial tie bar extending from an inboard side of the CE casting and a pinion end (PE) casting having at least one PE integral partial tie bar extending from an inboard side of the PE casting. Each PE partial tie bar is welded to a respective CE partial tie bar.

7 Claims, 4 Drawing Sheets

5,497,544

STATOR FRAME FABRICATION

BACKGROUND OF THE INVENTION

1. Field of the Invention

This invention relates generally to stator frame fabrication, and, more particularly, to a stator frame useful in alternating current traction motors for locomotive applications.

2. Description of the Related Art

One conventional method of stator frame fabrication uses an octagonal stator lamination punching with two cast end pieces and four cast tie bars. Stator laminations are clamped between the end pieces which are joined by the tie bars. The end pieces and tie bars require machining prior to assembly including extensive milling of flat surfaces for attachment. Additionally, a large number of individual welds are used, including, for example, filet-type, "J" groove, and butt welds. Because the welding requirements vary from corner-to-corner, the resulting lack of symmetry requires that special biasing techniques be used during fabrication to compensate for unequal weld shrinkage during frame assembly to insure sufficient accuracy of the finished stator lamination bore.

Another conventional method of stator frame fabrication uses a circular lamination punching with two circular-shaped cast end pieces and four arched tie bars. In addition to requiring two heavy butt welds for each tie bar, this method may require difficult machining procedures to prepare the arched bars for attachment.

SUMMARY OF THE INVENTION

Accordingly, one object of the present invention is to provide a stator frame fabrication process which requires less individual welds and less difficult machining than conventional stator frame fabrication processes.

Another object of the present invention is to provide a stator frame having symmetrical welding requirements.

Another object of the present invention is to lower stator frame fabrication process costs while yielding a highly accurate stator bore without biasing during fabrication.

Briefly, in accordance with a preferred embodiment of the invention, a stator frame comprises a connection end (CE) casting having at least one CE integral partial tie bar extending from an inboard side of the CE casting and a pinion end (PE) casting having at least one PE integral partial tie bar extending from an inboard side of the PE casting. Each PE partial tie bar is welded to a respective CE partial tie bar.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
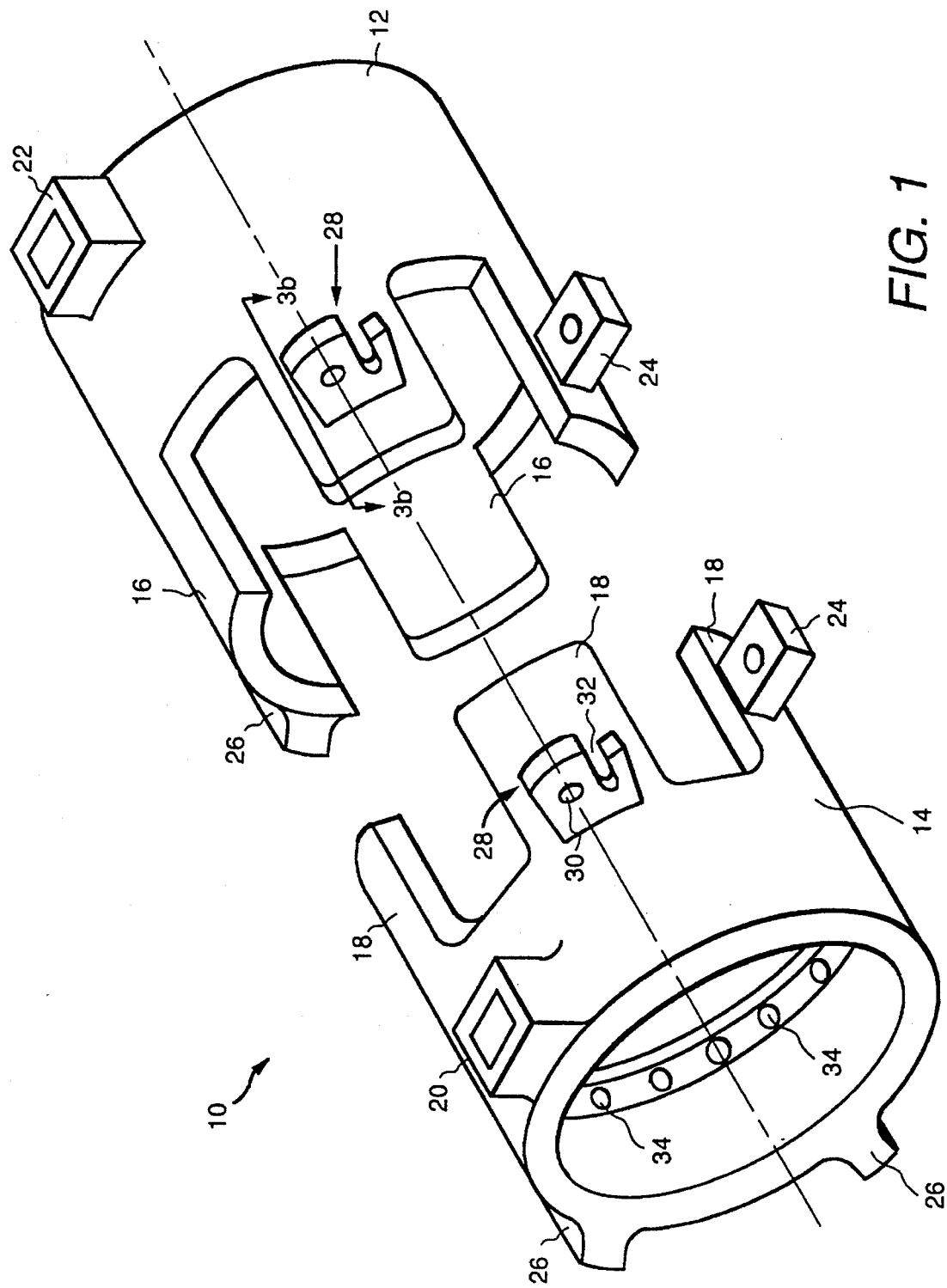
FIG. 1 is an expanded perspective view of one embodiment of a stator frame of the present invention.

FIG. 1 is an expanded perspective view of a stator frame 10 of the present invention. The stator frame includes two end castings, shown as connection end (CE) casting 12 and pinion end (PE) casting 14. The end castings may comprise a material such as cast steel, for example.

The CE casting includes a plurality of CE partial tie bars 16 on its inboard side. The term "inboard side" means the side of an end casting which will face the other end casting when the stator frame is completed. The term "partial tie bar" means an extension from one of the end castings which does not extend all the way to the other end casting but forms a whole tie bar when held together by a butt weld to a respective other partial tie bar (as described below). The CE casting and the CE partial tie bars comprise an integral piece. In one embodiment, four CE partial tie bars are used. The shape of these end castings can be any desired shape such as circular or octagonal, for example, but preferably, for ease of machining, the portion of the inside surface of the casting where the stator laminations will be situated has a circular configuration.

PE casting 14 includes a plurality of PE partial tie bars 18 on its inboard side which are integral to the PE casting. Each one of PE partial tie bars 18 corresponds to a respective one of CE partial tie bars 16. In another embodiment of the invention, shown in FIG. 4, each end casting has a "single tie bar" which extends over most of the circumference of the casting with a corresponding notch for axle clearance.

An air inlet 20 can be positioned on one end casting, and a terminal box connection 22 can be positioned on the other end casting. Slots 34 are preferably formed in both castings to allow air flow through stator lamination holes (not shown). A pair of supporting lugs 24 is used for securing the motor during motor operation. Protrusions 26 can be used for U-tube (axle bearing suspension tube) attachment (U-tubes not shown). Lugs 28 have lifting holes 30 to support the stator frame and safety notches 32 for engaging an external shelf from the transom of the railroad truck to prevent the stator frame, and thus the motor, from falling in the event of a malfunction.

In one embodiment, the end casting diameters are about 32 inches, the combined length of the partial tie bars is about 21.5 inches, the thickness of the partial tie bars is about 1.0 inch, and each one of four tie bars covers about 60 degrees of the arc of embrace of the end casting. Typically, the length of the tie bars of the PE casting differs from the length of the tie bars of the CE casting because in a preferred embodiment the tie bars are welded at a point about half way between supporting lugs 24 which are off center to insure centering the reaction load at mid-width of the truck transom.

Figure 2:
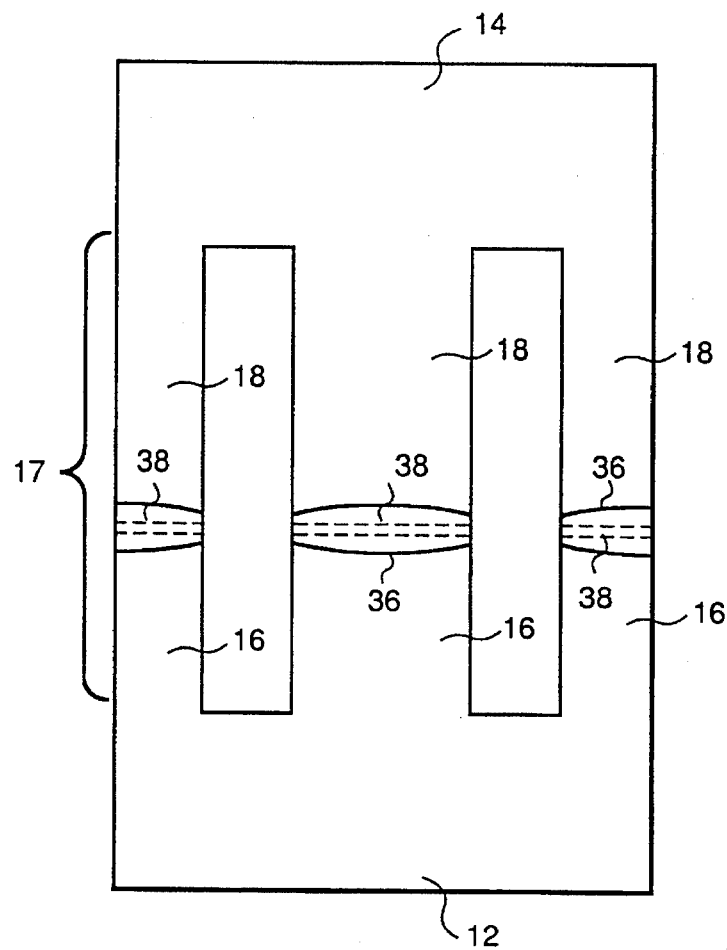
FIG. 2 is a partial side view of the butt welds used in the stator frame shown in FIG. 1.

FIG. 2 is a partial side view of butt welds 38 used in stator frame 10 of FIG. 1 to form whole tie bars 17 from partial tie bars 16 and 18. In a preferred embodiment, the ends of partial tie bars 16 and 18 have "J" groove weld preparations, shown as grooves 36, machined in their ends to allow complete penetration of the welding material. In one embodiment, the welding material for butt welds 38 is a stick weld or a metal inert gas (MIG) weld. Preferably the same type and amount of welding material is used for each of the butt welds to encourage uniform and symmetrical shrinkage in each quadrant and thus minimize distortion of the stator lamination bore (laminations not shown in FIG. 2).

Figure 3A:
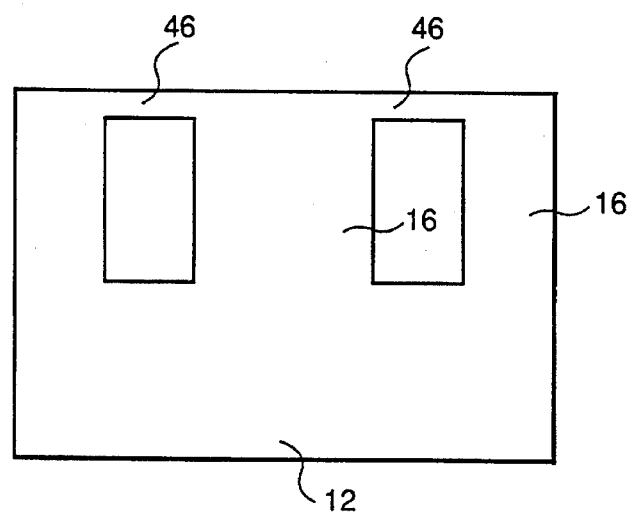
FIG. 3a is a partial side view of an individual end casting prior to machining.

In a preferred embodiment, each end casting is pre-machined by positioning the end casting in a vertical lathe or "bullard" to machine the casting with a circular cut. FIG. 3a is a partial side view of an individual end casting prior to machining. In this preferred embodiment, the end casting is cast so as to have short struts 46 which will be removed by machining the "J" groove butt weld preparation as a final machining step. The struts help to reduce vibrations in the end casting during machining of much of the interior surface of the end casting.

Figure 3B:
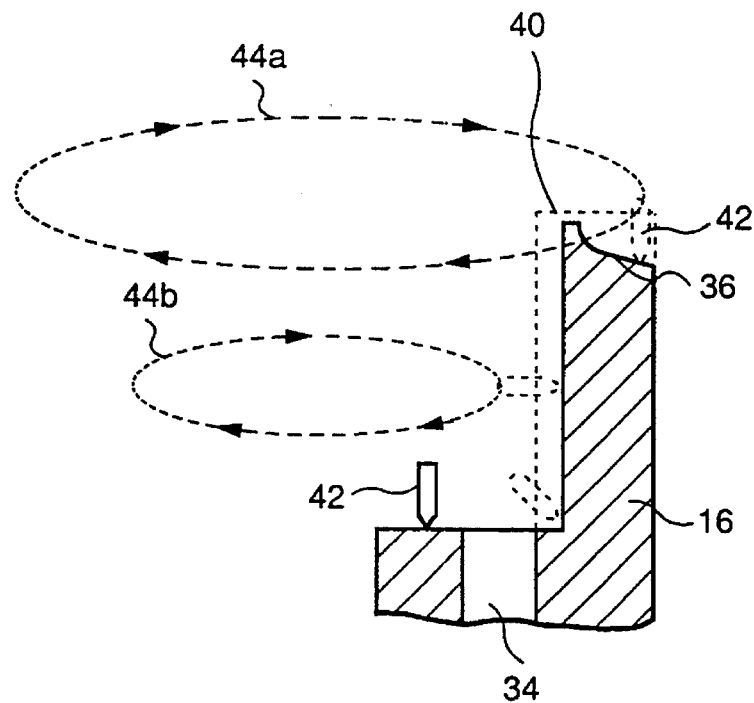
FIG. 3b is a sectional side view of an individual partial tie bar used in the stator frame of the present invention.

FIG. 3b is a sectional phantom side view of an individual partial tie bar 40 before machining occurs. A cutting tool 42, which may comprise a material such as tool steel or tungsten carbide for example, is used to create a "J" groove weld preparation (shown as grooved surface 36) and to cut along the vertical edges of each partial tie bar in a circular direction (indicted by lines 44a and 44b). Cutting tool 42 cuts the surface of the end casting between partial tie bars to produce a smooth surface and provide for accurate placement and pressing of stator laminations. The machine is programmed so that the cutting tool angle and depth is automatically adjusted. After one of the end castings is machined, the other end casting can be machined in the same manner.

Figure 3C:
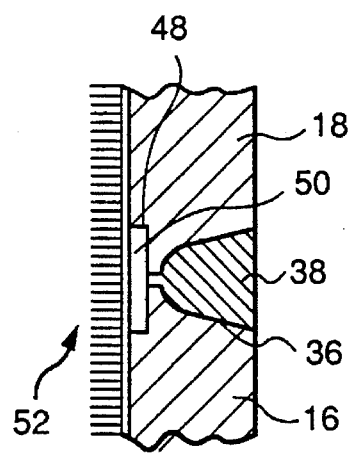
FIG. 3c is a sectional side view of one weld of the present invention.

FIG. 3c is a sectional side view of one weld of the present invention. In this embodiment, during the machining the cutting tool cuts an undercut 48 in each respective CE and PE tie bar on the opposite side of each respective groove 36.

After the laminations are stacked in one of the end castings, the other of the end castings is positioned over the laminations and presses the laminations. At this time a high temperature material 50 such as backup tape supplied by 3M Corporation is positioned in each pair of undercuts 48 by sliding the tape in place through an exposed portion of the pair of undercuts, for example. Then weld material 38 is applied in grooves 36. The undercut and high temperature material prevent the laminations from fusing to the later added weld material 38.

Figure 4:
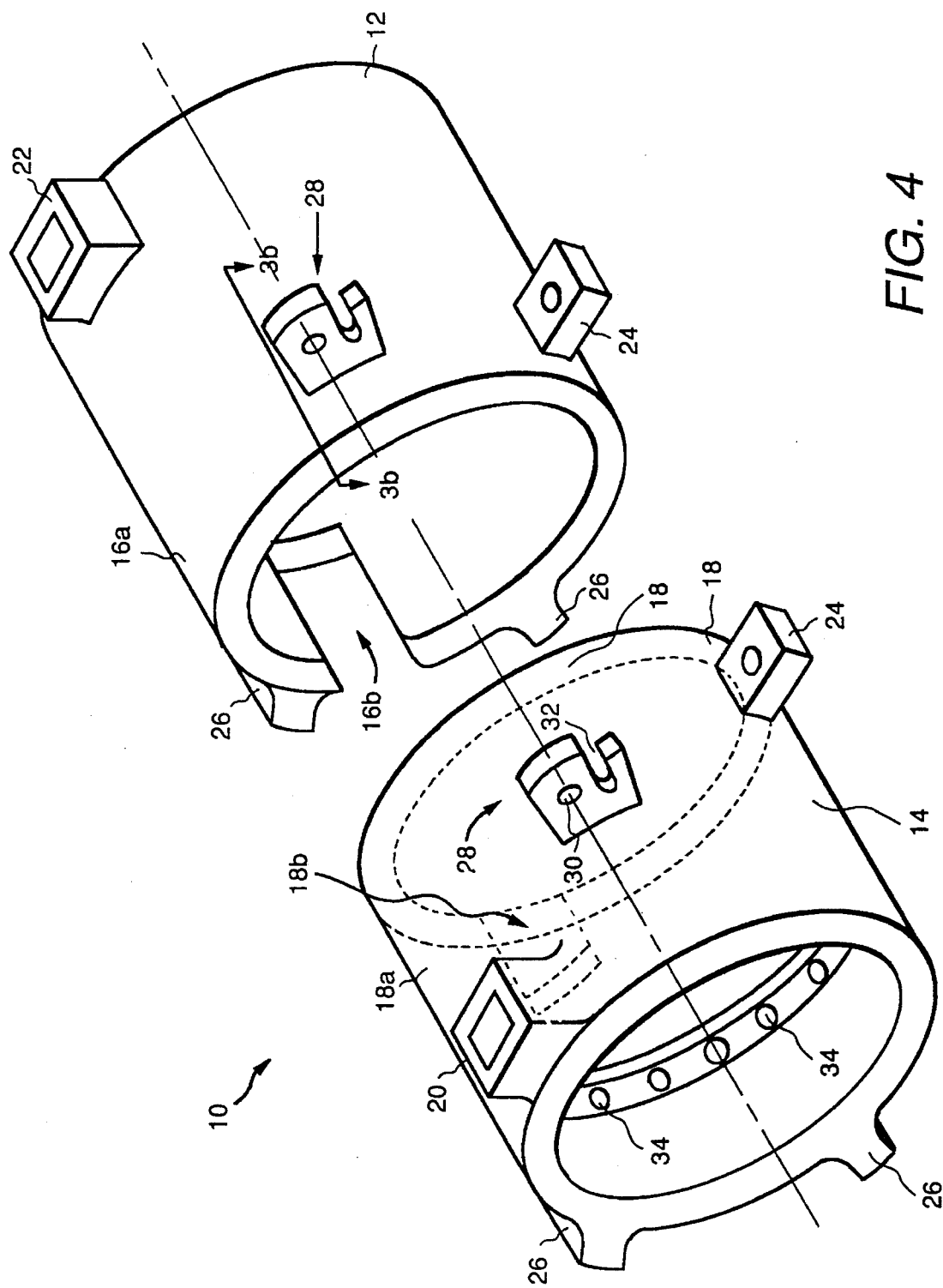
FIG. 4 is an expanded perspective view of another embodiment of a stator frame of the present invention.

FIG. 4 is an expanded perspective view of another embodiment of a stator frame of the present invention. In this embodiment, the CE casting 12 has a "single tie bar" 16a which preferably comprises an open-ended cylinder extending over most of the circumference of the end casting with a corresponding notch 16b for axle clearance. Likewise, the PE casting 14 has a "single tie bar" 18a which preferably comprises an open-ended cylinder extending over most of the circumference of the end casting with a corresponding notch 18b.

The configuration of FIG. 4 provides a nearly symmetrical weld for improved distortion control. For complete weld symmetry, weld material may be omitted in the area of a groove 36 (shown in FIGS. 2–3c) which is situated opposite the notches.

Although the configuration of FIG. 4 can result in a stator frame with increased weight, there are several advantages. When the stator frames comprise iron-based steel castings and tie bars, the open-ended cylinder arrangement of FIG. 4 provides electromagnetic interference (EMI) shielding. A smaller weld thickness (about 0.92 inches) is required than the weld thickness (about 1.25 inches) when four sets of partial tie bars are welded. Furthermore, when a single weld is prepared, there are fewer start and stop locations and thus less opportunities for contamination during the welding process.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for fabricating a stator comprising the steps of:
    machining a connection end (CE) casting including a plurality of CE integral partial tie bars extending from an inboard side of the CE casting;
    machining a pinion end (PE) casting including a plurality of PE integral partial tie bars extending from an inboard side of the PE casting, each one of the PE partial tie bars corresponding to a respective one of the CE partial tie bars;
    stacking a plurality of stator laminations in one of the CE and PE castings; and then
    welding each of the PE partial tie bars to a respective one of the CE partial tie bars.

2. The method of claim 1, wherein the CE casting has an interior surface, at least a portion of the CE casting interior surface having a circular shape, and wherein the PE casting has an interior surface, at least a portion of the PE casting interior surface having a circular shape, and
    wherein the steps of machining the CE casting and machining the PE casting include machining the CE and PE castings and the CE and PE integral partial tie bars with a circular cut.

3. The method of claim 2, wherein the steps of machining the CE and PE castings include forming a grooved surface on an end of each of the CE and PE partial tie bars, and wherein the step of welding includes positioning welding material in each groove.

4. The method of claim 2, wherein, prior to the steps of machining the CE and PE castings, the CE casting has a plurality of struts, each of the struts connecting a respective pair of the CE tie bars and the PE casting has a plurality of struts, each of the struts connecting a respective pair of the PE tie bars, and
    wherein the steps of machining the CE and PE castings are performed so as to remove each of the struts prior to the step of welding.

5. The method of claim 3, wherein the steps of machining the CE and PE castings further include forming an undercut on an opposite side of each respective grooved surface of each respective end of the CE and PE partial tie bars,
    and further including the step of positioning a high temperature material in each undercut prior to the step of welding to prevent the laminations from fusing to material used for welding.

6. A method for fabricating a stator comprising the steps of:
    machining a connection end (CE) casting including an open-ended CE cylinder extending from an inboard side of the CE casting and having a CE notch;
    machining a pinion end (PE) casting including an open-ended PE cylinder extending from an inboard side of the PE casting and having a PE notch, the PE notch corresponding to the CE notch, forming a grooved surface on an end of each of the CE and PE cylinders;

stacking a plurality of stator laminations in one of the CE and PE castings;

aligning the PE and CE notches; and then positioning welding material in each groove and welding the PE cylinder directly to the CE cylinder.

7. The method of claim 6, wherein the CE casting has an interior surface, at least a portion of the CE casting interior surface having a circular shape, and wherein the PE casting has an interior surface, at least a portion of the PE casting interior surface having a circular shape, and wherein the steps of machining the CE casting and machining the PE casting include machining the CE and PE castings and the CE and PE cylinders with a circular cut.

* * * * *